United States Patent
Klinke

(10) Patent No.: US 7,506,560 B2
(45) Date of Patent: Mar. 24, 2009

(54) ACTUATOR

(75) Inventor: Norbert Klinke, Augustenborg (DK)

(73) Assignee: Linak A/S, Nordborg (DK)

( * ) Notice: Subject to any disclaimer, the term of this patent is extended or adjusted under 35 U.S.C. 154(b) by 0 days.

(21) Appl. No.: 10/529,648

(22) PCT Filed: Oct. 30, 2003

(86) PCT No.: PCT/DK03/00740

§ 371 (c)(1),
(2), (4) Date: Mar. 31, 2005

(87) PCT Pub. No.: WO2004/040169

PCT Pub. Date: May 13, 2004

(65) Prior Publication Data

US 2006/0054451 A1 Mar. 16, 2006

(30) Foreign Application Priority Data

Oct. 30, 2002 (DK) ............................... 2002 01650

(51) Int. Cl.
*F16H 57/10* (2006.01)
*F16D 67/00* (2006.01)
(52) U.S. Cl. .................... 74/411.5; 267/204; 192/223.4
(58) Field of Classification Search ................ 74/411.5, 74/22 A, 89.23, 421 R, 421 A; 192/223.4; 267/199, 204, 214; 188/196 D, 196 P, 381
See application file for complete search history.

(56) References Cited

U.S. PATENT DOCUMENTS

| 4,246,991 | A | * | 1/1981 | Oldakowski | ............. | 192/223.4 |
| 4,651,854 | A | * | 3/1987 | Harada | .................... | 192/223.4 |
| 4,865,151 | A | * | 9/1989 | Kobayashi et al. | .......... | 180/179 |
| 5,203,113 | A | * | 4/1993 | Yagi | ............................. | 49/324 |
| 5,308,154 | A | * | 5/1994 | Matouka | .................... | 303/115.2 |
| 6,085,368 | A | * | 7/2000 | Robert et al. | .................. | 5/85.1 |
| 6,232,684 | B1 | * | 5/2001 | Haag et al. | ................. | 310/68 R |
| 6,290,207 | B1 | * | 9/2001 | Genga et al. | ................. | 251/174 |
| 6,371,440 | B1 | * | 4/2002 | Genga et al. | ........... | 251/129.03 |
| 6,561,055 | B1 | * | 5/2003 | Turk | ........................... | 74/425 |
| 6,814,209 | B1 | * | 11/2004 | Acosta | ..................... | 192/223.2 |
| 2004/0221670 | A1 | * | 11/2004 | Becker et al. | .............. | 74/411.5 |

FOREIGN PATENT DOCUMENTS

EP 0662573 * 7/1995

* cited by examiner

*Primary Examiner*—Richard W L Ridley
*Assistant Examiner*—James Pilkington
(74) *Attorney, Agent, or Firm*—Dykema Gossett PLLC

(57) ABSTRACT

An actuator, preferably a linear actuator, a reversible motor which drives an adjustment element via a transmission. To increase the self-clocking ability of the actuator, the actuator is equipped with a coil spring which has its one end secured to a rotating element in the actuator so that the spring is carried along in the rotation on the cylindrical part, which is static in relation thereto. When the motor is turned off, and the load on the actuator tries to displace the adjustment element, the movement of the coil spring is blocked, and the coil spring is tightened around the cylindrical part.

10 Claims, 2 Drawing Sheets

ACTUATOR

BACKGROUND OF THE INVENTION

1. Field of the Invention

The present invention relates to an actuator comprising a reversible motor, a transmission operatively connected to the motor, a movable adjustment element operatively connected to the transmission, a cylindrical part, a coil spring arranged on the cylindrical part and with the direction of winding such that the spring exerts a braking effect on the adjustment element in the one direction of movement thereof in that the spring is tightened around the cylindrical part, said braking effect being adapted such that it may be overcome by the motor.

2. The Prior Art

EP 0 662 573 to Linak A/S discloses a linear actuator, where a reversible electric motor, via a transmission, drives a spindle with a nut secured against rotation. A tubular adjustment element is secured to the nut, whereby the adjustment element is displaced axially between an extended position and a retracted position when the spindle is rotated one way and the other way, respectively. The actuator is to have a sufficient self-locking ability for the adjustment element to remain in the position concerned when the motor is stopped. To achieve the sufficient self-locking ability, EP 0 662 573 teaches to arrange a coil spring, whose one end is secured, around a rotating element in the transmission to exert a braking force, so that the actuator is self-locking. The screw is configured and arranged so as to exert a braking force in the inward direction of the adjustment element, as the friction between the rotating element and the spring causes the spring to contract around the rotating element, and to open, i.e. loosen its grip around the rotating element, in the outward direction of the adjustment element. Since its appearance in 1995, the structure has been widely used not only in single actuators, as shown in EP 0 662 573, but also in dual actuators, as shown in DE 38 42 078 A1 to Niko Gesellschaft für Antriebstechnik mbH, and EP 1 014 834 to Okin Gesellschaft für Antriebstechnik mbH & Co. KG, as well as in actuators constructed as lifting columns, including lifting columns for height-adjustable tables, cf. e.g. WO 02/39848 A1 to Linak A/S. The structure has also been described later on by a competitor in DE 296 06 367 U1 to Okin Gesellschaft für Antriebstechnik mbH.

SUMMARY OF THE INVENTION

The invention provides another solution, where the coil spring has its one end secured to a rotating element in the device such that spring is carried along in the rotation on the cylindrical part, which is static in relation thereto. When the actuator runs in a direction where the spring is rotated against its winding direction, the spring will try to open and thereby will not exert any, or just insignificant, resistance to the movement. In the opposite direction where the spring is rotated in the winding direction, the spring will be tightened around the cylindrical part and exert a holding force. A non self-locking actuator may thereby be made self-locking, or the braking effect in a self-locking actuator may be increased considerably. In a non self-locking actuator, the braking effect may also be adjusted so that it is just self-locking until a certain load, or continues to be non self-locking, but is moved controllably under the action of the braking force. The braking effect is affected by many parameters, such as selection of material, properties of material, lubricants, temperature, cross-section of the spring, number of windings of the spring, bias, i.e. how tightly the spring is arranged on the cylindrical part.

When the spring exerts its braking effect, which is caused by friction, a not inconsiderable amount of heat is generated, which may not only have adverse consequences for the braking effect, but may also damage the surrounding structure. In this respect, the invention basically has the advantage over the prior art structure that the heat is passed via the cylindrical part directly into the static structure, typically a form of cabinet. If, moreover, this or the area concerned is of metal, the cooling is even more effective. Owing to the braking effect, it is desirable that the spring is arranged on a plastics coating, for which purpose a cylindrical part of metal may be provided with a plastics coating, e.g. in the form of a coating moulded thereon, a sleeve secured against rotation or embedded ribs.

Although the invention is primarily intended for use in connection with linear actuators based on a spindle, it will be appreciated that the invention may also be used in connection with rotating actuators, as described e.g. in WO 01/17401 A1.

An embodiment of the invention will be described more fully below with reference to the accompanying drawings.

DETAILED DESCRIPTION OF THE PREFERRED EMBODIMENT

Figure 1:
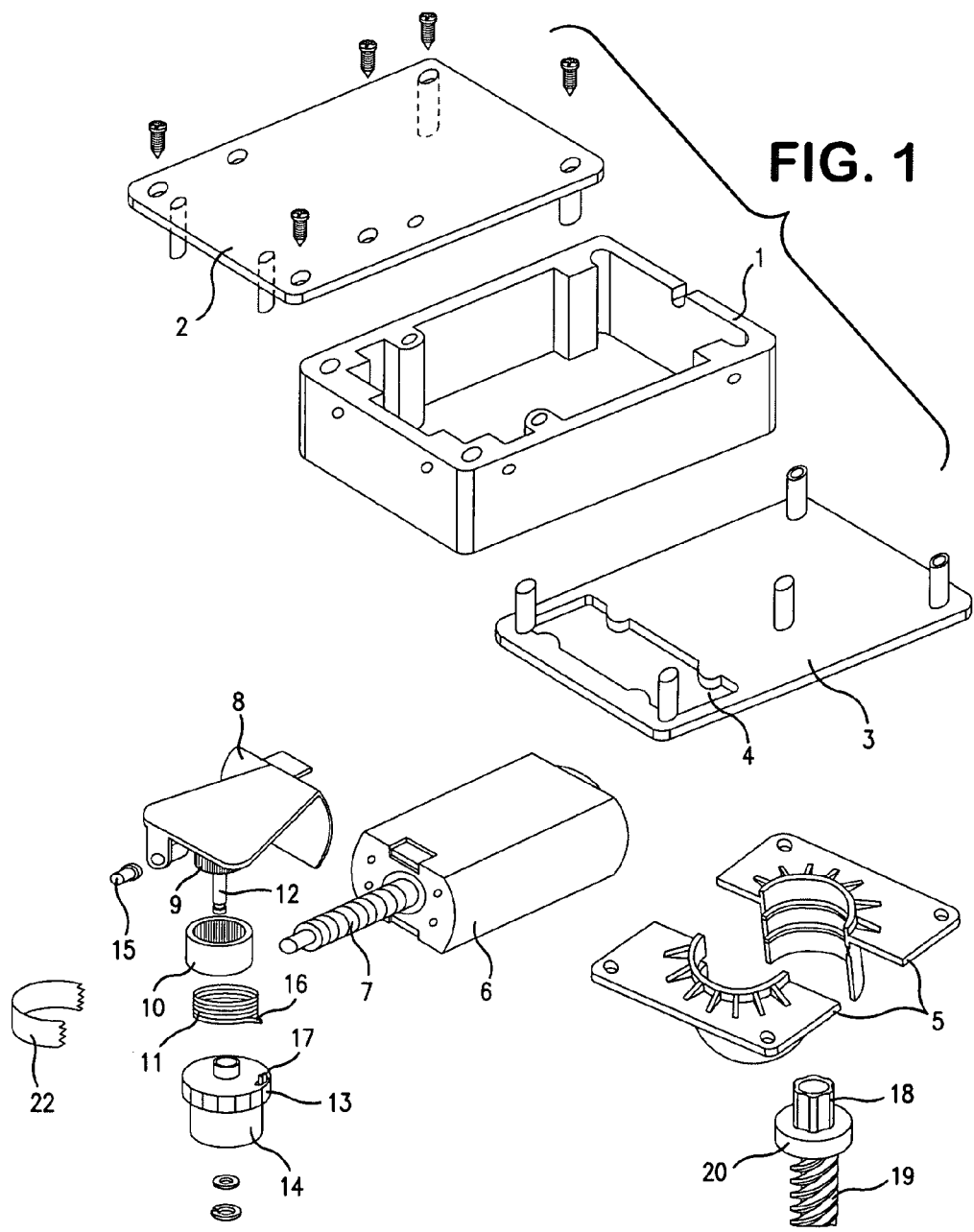
FIG. 1 shows an exploded view of the motor part of the actuator.
Figure 1A:
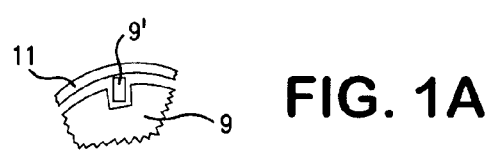
FIG. 1A shows an alternative detail.

The basis for the description is an actuator in the form of a lifting column for height-adjustable tables having two or three telescopic members driven by a single solid spindle or a solid spindle in combination with a hollow spindle. The drawing just shows the parts necessary for the understanding of the invention.

As will appear, the actuator comprises a housing 1 with a cover 2 and a bottom plate 3, the bottom plate being formed with a recess 4 for a bearing block 5. The housing accommodates a reversible DC motor 6, where an extension of the motor shaft is shaped as a worm 7. The front end of the motor 6 has secured thereto a bracket 8 of metal with a cylindrical part 9, over which plastic bushing 10 is arranged and secured against rotation by a splined connection. A coil spring 11 is provided inwardly over the plastic bushing 10 and is biased as the opening in the spring is slightly smaller than an external diameter of the plastic bushing. The coil spring 11 can be externally surrounded by a heat-conducting metal shield 22. The coil spring can contact axially-extending plastic strips 9' on the cylindrical part 9. The cylindrical part 9 securely mounts a bearing shaft 12 for a worm wheel 13 in engagement with the motor worm 7. On one side, the worm wheel has a cylindrical boss 14 with a hollow for non-rotational reception of the end 18 of a spindle 19, mounted in the bearing block 5 with the ball bearing 20. It is noted that the coil spring 11 with a radially protruding end 16 is rotationally connected with the other side of the worm wheel in a bracket 17. Finally, it is noted for the sake of completeness that the end of the worm 7 is controlled in a slide bearing 15 in the bracket 8.

Figure 2:
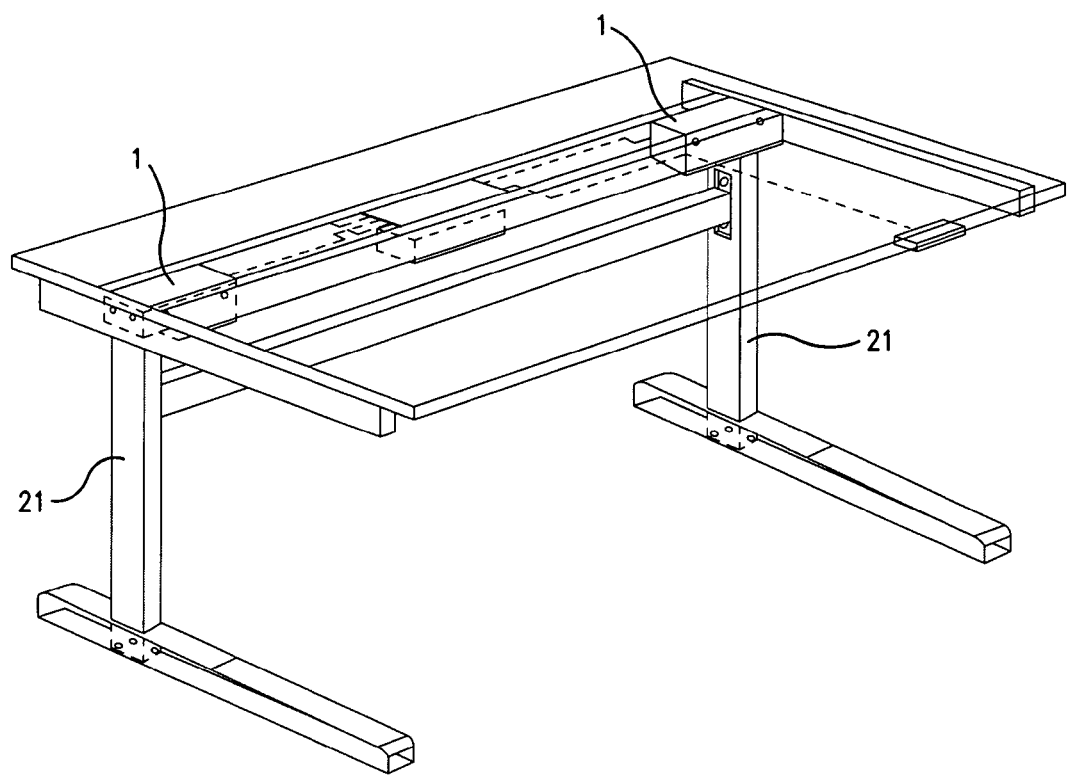
FIG. 2 shows a schematic view of a height-adjustable table.

FIG. 2 of the drawing schematically shows a height-adjustable table, where the tabletop, shown to be transparent, is carried by an underframe with a lifting column 21 at each side. The lifting column may have one or two extensible members depending on the desired minimum and maximum height of the table. The lowermost member of the lifting column is mounted in a foot, while the uppermost member with the housing is mounted below the tabletop.

When the motor is started, so that the worm 7 rotates clockwise, also the worm wheel 13 rotates clockwise, and thereby also the spindle 19 rotates clockwise. The spindle then screws itself up through a spindle nut secured in the preceding member, thereby extending the innermost member and raising the tabletop. During this operation, the coil spring 11 is rotated clockwise via the coupling 16, 17 with the worm wheel 13. The spring is then rotated on the plastics bushing 10, and the friction between the spring and the plastics bushing causes the spring to expand and thereby loosen its grip around the plastics bushing. Owing to the expansion, the friction between the spring and the plastics bushing is so minimal that it is quite without importance. When the desired height of the table has been reached, the motor is stopped, and the weight of the tabletop and the load on it will then try to press the innermost member downwards. The spindle 19 will then try to screw itself down through the spindle nut with an anti-clockwise direction of rotation. The worm wheel 13 will then be forced in the same direction, and so will the spring 11 because of its connection with the worm wheel. As it is attempted to rotate the spring anticlockwise, it will contract and tighten its grip around the plastics bushing 10 and prevent the movement. The tabletop then remains at the desired height. When the tabletop is to be lowered, the motor is started in the direction so that the worm 7 rotates anticlockwise. The worm wheel 13 will then also rotate anticlockwise and via the coupling 16, 17 force the spring 16 around on the plastics bushing 10. The motor thus overcomes the braking effect of the spring on the plastics bushing, during which a not inconsiderable amount of frictional heat is generated. This heat is conveyed over to the metallic bracket 8 via the cylindrical part 9, thereby conveying the heat away from the spring 11 and the plastics bushing 10, which is relatively thin. The reason why the heat is to be dissipated is primarily to avoid melting of the plastics bushing 10 and destruction of the grease on the spring/bushing.

It will be appreciated that the braking effect of the spring is a delicate balance between achieving a sufficient self-locking on the lifting column so that it keeps its position when the current to the motor is cut off, and overcoming this braking effect with the least possible motor power when the column is to be retracted, and finally ensuring that the spring does not act against the motor when the column is extended.

The invention has been explained above in connection with linear actuators affected by a compressive load, i.e. works against a compressive load when they are extended, but it will be appreciated that the invention, of course, also covers actuators which operate under tension, i.e. pull a load when it is retracted. The same applies to rotating actuators, of course.

It has been shown in the embodiment above that the coil spring is secured to a worm wheel. This is an extremely attractive solution since a worm gear performs well in an actuator with a good transmission, compact, low noise level, inexpensive, etc. Of course, there are other solutions, thus the end of the spindle may be passed through the worm wheel and be received in a bearing positioned in a part constructed as the cylindrical part of the spring. In actuators having an additional worm wheel symmetrical with the first one to support the worm, the spring may be arranged in connection with the additional worm wheel.

Braking force or braking effect is taken to mean that the spring exerts a force or rather a moment which contributes to the self-locking ability. Thus, it is not so that that the spring as such acts as an active brake like when a driver steps on the foot brake in a car. Rather, it may be compared to the parking brake of a car, which is activated when the car stands still and is released when the car is started.

The invention claimed is:

1. An actuator comprising
   a reversible motor,
   a transmission operatively connected to the motor,
   a spindle with threads, said spindle being operatively connected to the transmission to rotate the spindle multiple revolutions,
   a movable adjustment element having threads in engagement with the threads of the spindle for moving the movable adjustment element along the spindle,
   a cylindrical part which is static, fixed and immovably mounted relative to the motor,
   a rotating element attached to an end of the spindle and rotatable by the motor,
   a coil spring with a first end secured to the rotating element, said coil spring being arranged on the cylindrical part and with a direction of winding such that the spring exerts a braking effect on the adjustment element in one direction of movement thereof in that the spring is tightly wrapped around the cylindrical part, said braking effect being adapted such that it may be overcome by the motor, and
   wherein an axis of the coil spring is in alignment with an axis of the rotating element so that the spring is carried along in the rotation on the cylindrical part.

2. The actuator according to claim 1, wherein the cylindrical part comprises metal.

3. The actuator according to claim 2, wherein the cylindrical part has core of metal provided with a plastic bushing thereon secured against rotation, at least on a part where the coil spring is arranged.

4. The actuator according to claim 2, wherein the cylindrical part comprises axially-extending strips of plastic on which the spring is arranged.

5. The actuator according to claim 1, wherein the cylindrical part forms part of a bracket fixedly mounted on the front end of the motor.

6. The actuator according to claim 1, wherein the transmission comprises a worm drive with a worm and wherein said rotating element is a worm wheel, said coil spring having its one end connected to the worm wheel.

7. The actuator according to claim 6, wherein the coil spring includes a radially outwardly bent end at its one end secured to the worm wheel.

8. The actuator according to claim 6, wherein the coil spring includes an axially bent end at its one end secured in a hole in the worm wheel.

9. The actuator according to claim 1, including a heat-conducting metal shield around the coil spring to convey heat away from the spring.

10. The actuator according to claim 1, wherein the coil spring comprises metal wire, and wherein the wire has a four-sided, circular or oval cross-section.

\* \* \* \* \*